3,402,769
FRACTURE DETECTION METHOD FOR
BORE HOLES
Otto Glenn Doggett, Abilene, and John R. Seay, Midland, Tex., assignors to Go Services, Inc., a corporation of Texas
Filed Aug. 17, 1965, Ser. No. 480,322
4 Claims. (Cl. 166—4)

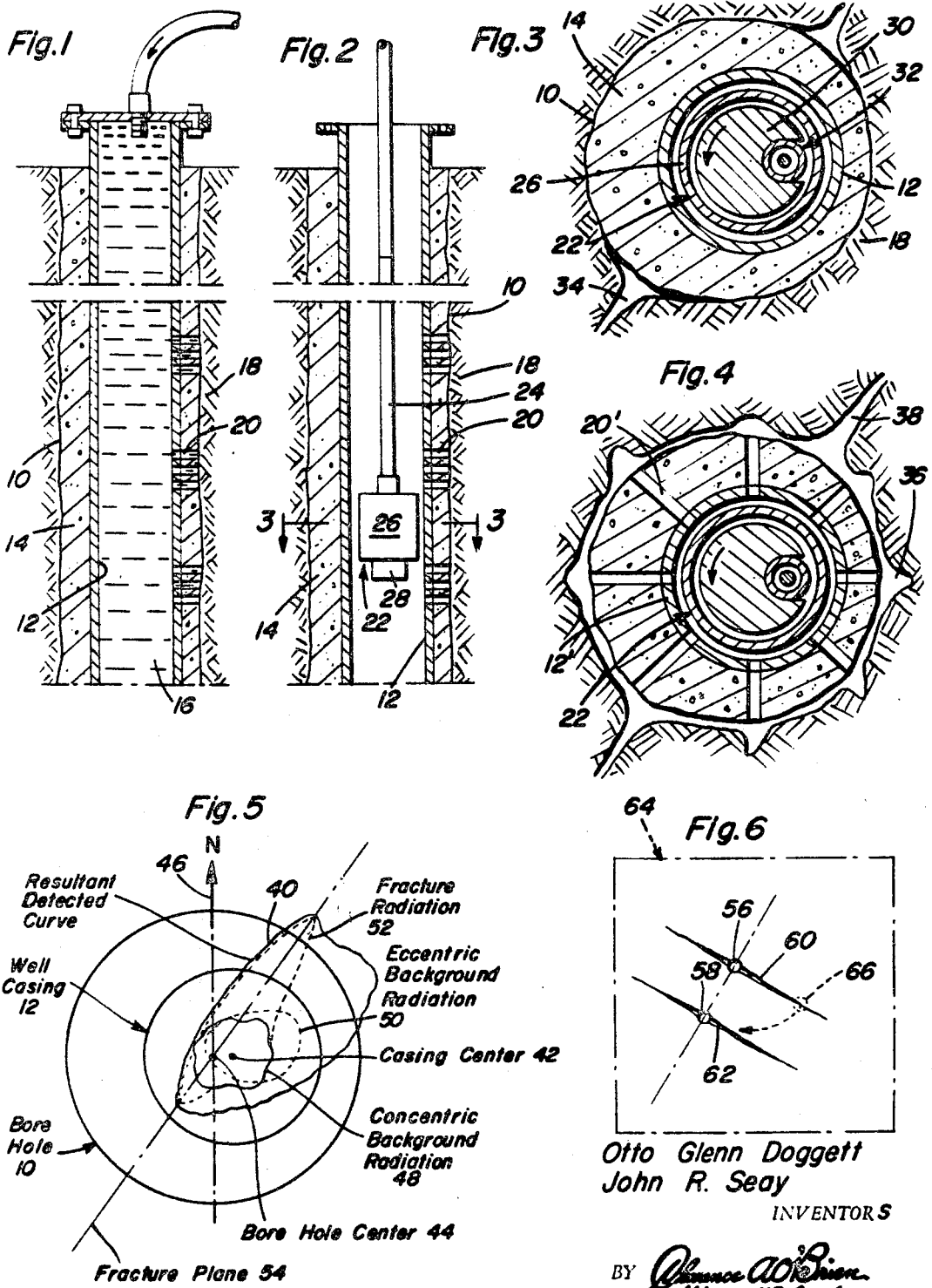

ABSTRACT OF THE DISCLOSURE

The peripheral distribution of fracturing fluid about a bore hole is measured and recorded at various levels by detection of radiation emitted from a radio active tracer in the fracturing fluid in order to locate vertical fracture planes intersecting the bore hole. The recorded distribution of fracturing fluid is corrected for errors introduced by background radiation and bore hole casing eccentricity so that the angular orientation of any vertical fracture planes may be determined by analysis and interpretation of the recorded data.

---

This invention relates generally to the investigation of subsurface formations and more particularly to methods and apparatus for determining the extent and nature of the formation for extracting subsurface oil, gas, water, etc.

The method of the present invention is concerned with the investigation of subsurface soil and rock formations about a bore hole which has been completed by cementing, the formation being fractured by the injection of a fracturing medium under pressure through perforation in the bore hole casing. Fracture investigation methods heretofore have been concerned merely with the extent to which horizontal fracturing occurs at various depth levels.

It is accordingly an object of the present invention to provide a method by means of which variations in the subsurface formation about a bore hole may be determined in both a vertical direction as well as in horizontal planes in order to obtain more complete information as to the physical properties of the formation surrounding the bore hole including information regarding the shear planes along which the subsurface formation is fractured.

An additional object of the present invention is to provide methods for obtaining data regarding the radial distribution of fracturing fluid injected into a subsurface formation through a bore hole in order to investigate the establishment of vertical fracture planes.

In summary, the present invention provides a method for radially inspecting a subsurface formation within a bore hole by use of a radiation detector which is rotated at a relatively slow speed about an axis parallel to the longitudinal axis of the bore hole. The radiation detector is positioned in eccentric relation to the bore hole axis and so shielded as to more accurately detect the variation in radiation intensity at a plurality of inspection levels. The fracturing fluid utilized contains a radioactive tracer agent so that the radial distribution of the fracturing fluid or medium may be measured and recorded by the radiation detector. Radiation detection is also recorded prior to injection of the fracturing fluid so that the recorded data may be corrected for errors introduced by background radiation and eccentricity of the bore hole casing relative to the bore hole center. The corrected data may then be utilized to determine the angular orientation of any vertical fracture planes intersecting the bore hole.

In accordance with the foregoing objects, an additional object of the present invention is to provide a method of obtaining data regarding the radial distribution of a fracturing medium introduced into a subsurface formation through a bore hole, the data being obtained in such a manner as to permit interpretation thereof with regard to the location of fracturing planes.

Yet another object of the present invention is to provide apparatus for investigating the radial distribution of fracturing medium about a bore hole, the apparatus including an eccentrically positioned radiation detector so shielded as to provide a more accurate indication of the circumferential variation in the radiation level produced by the radioactive tracer carried by the fracturing medium.

A still further object of the present invention in accordance with the foregoing objects is to provide a method for obtaining information regarding subsurface fracture planes so as to assist in the more fruitful location of wells relative to each other within a given field having a subsurface source of fluid to be extracted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic sectional view through a typical bore hole that has been prepared for fracturing a subsurface formation by means of a fracturing medium under pressure;

FIGURE 2 is a diagrammatic sectional view through the same bore hole after fracturing, showing the use of apparatus in accordance with the present invention for inspecting the fractured condition of the subsurface formation;

FIGURE 3 is a transverse sectional view taken substantially through a plane indicated by section line 3—3 in FIGURE 2;

FIGURE 4 is a transverse sectional view similar to that of FIGURE 3 but associated with an alternative method;

FIGURE 5 is a graphical illustration of information obtained in accordance with the method of the present invention and showing the manner in which such information may be interpreted; and FIGURE 6 is a diagrammatic illustration showing one possible use for the method and apparatus of the present invention.

Referring now to the drawings in detail and initially to FIGURE 1, it will be observed that to practice the method of the present invention, a vertical bore hole or well 10 is drilled through a subsurface formation 18 after which a well casing 12 is inserted and the bore hole completed by introducing cement 14 between the vertical walls of the bore hole and the external surface of the casing 12. Thereafter, the casing is perforated in a well known manner at vertically spaced levels so that a fracturing medium including, for example, a fluidized sand 16 may be injected into the subsurface formation 18 through the perforations 20. It will of course be appreciated that other fluent fracturing media may be utilized including, for example, aluminum pellets, glass beads and jelled acid. The fracturing medium is therefore supplied under pressure to the casing 12 so as to fracture the subsurface formation 18 as it is injected under pressure into the formation through the perforations 20. The fracturing medium is irradiated or mixed with a radioactive substance such as iridium-192 constituting a radioactive tracer agent so that the distribution of the fracturing medium may be investigated.

Referring now to FIGURE 2, it will be observed that after the subsurface formation 18 has been fractured as described in connection with FIGURE 1 for example, a fracture inspection tool generally referred to by reference numeral 22 is lowered into the casing 12 so that the subsurface formation about the bore hole may be inspected at various levels. The fracture inspection tool 22 is therefore shown suspended in the well by means of a tubular member 24 connected to the tool housing 26 on which a direction orientating gyroscopic device 28 may be mounted.

Referring now to FIGURE 3 in particular, it will be observed that the fracture inspecting tool 22 concentrically mounts therewithin a lead shield member 30 for rotation about a vertical rotational axis extending through the tubular member 24. The member 30 is therefore adapted to be rotated by above surface equipment at a relatively low speed of one to six minutes per revolution. Since it is highly improbable that the well casing 12 can be inserted into the bore hole 10 in a position perfectly concentric to the bore hole throughout its vertical length at any particular level, the rotational axis of the tool 22 will in most cases be spaced from the geometric center of the bore hole 10 as shown. Further, eccentrically mounted by the rotating shield member 30 for limited exposure therefrom along one radial direction, is a radiation detector 32 such as a geiger or scintillation counter. The eccentric mounting arrangement of the detector 32 will provide a more accurate measurement of the radiation level at any instantaneous circumferential location thereof relative to the bore hole walls since it will be directly exposed only to radiation entering the bore hole from a radial direction closest to the detector. Also, radiation entering the bore hole from all other directions will be blocked by the shield member 30. Thus, the shielding and the eccentric disposition will essentially restrict detection of radiation to the circumferential location of the bore hole to which the detector 32 is closest at any instant, since radiations entering the bore hole from the other radial directions are at a greater distance from the detector and are blocked by the shielding material.

In accordance with one procedure utilized pursuant to the present invention, the casing 12 is perforated at vertically spaced fracturing levels at the same angular position. Accordingly, in order to investigate the presence of any vertical fracture zones such as the fracture zones 34 shown in FIGURE 3, it is necessary to position the tool 22 between the fracture levels as shown in FIGURE 2 inasmuch as horizontal fracture zones will not appear between the fracturing levels where the fracturing medium is injected. In an alternative procedure, the well casing 12' as shown in FIGURE 4 is perforated at the respective fracturing levels by a plurality of circumferentially spaced perforations 20'. Accordingly, fracturing fluid will be concentrated at circumferentially spaced zones 36 at the fracturing levels which vary in accordance with the relative porosity of the subsurface formation at the respective fracturing levels. A greater concentration of fracturing medium will, however, exist where vertical fracturing occurs such as shown by fracture zones 38 in FIGURE 4. Thus, in the alternative procedure the tool 22 may be positioned at the fracturing levels since the vertical fracture zones may appear at the fracture injection levels. It will therefore be appreciated that inspection of the bore hole by means of the tool 22 at various levels may provide information regarding the fracturing of the subsurface formation 18 and the permeability thereof in a vertical direction as well as to provide information regarding the establishment of vertical fracture zones by measuring radiation at levels spaced from the perforation levels as described with respect to FIGURE 3 or at the fracturing levels as described in connection with FIGURE 4. It will be appreciated, however, that at each inspection level, the radiation detector 32 will be rotated about the vertical rotational axis of the tool 22 at a relatively slow rate in order to traverse 360° of the bore hole 10 and obtain measurements of radiation at each circumferential location.

Referring now to FIGURE 5, a typical radiation curve 40 is shown recorded from the output of the detector 32 using a procedure as described in connection with FIGURES 1–3 and corresponding to inspection of the bore hole 10 at a level spaced from the fracture injection levels. The radiation curve 40 is plotted on polar coordinates about a center 42 corresponding to that of the well casing 12 which is shown as being eccentric to the bore hole 10 and hence spaced from the bore hole center 44. The curve 40 may be directionally orientated by means of data received from the gyroscopic device 28 in a well known manner which also furnishes the location of the bore hole center 44 relative to the casing center 42. Accordingly, the curve 40 is shown in FIGURE 5 as angularly orientated with respect to a reference direction indicated by line 46 which extends through the bore hole center 44.

In order to interpret the curve 40, the tool 22 is utilized to record a concentric background radiation curve 48 before the well is fractured by the fracturing medium and at a location where the casing 12 is concentric with the bore hole. This location is recognized when curve 48 encloses an area having a geometric center substantially lying on the origin 44. Thus, this concentric background radiation curve 48 when placed over the curve 40 about origin 42 may explain any irregularities in the resultant curve 40 which do not arise because of the distribution of the fracturing medium. Further, in interpreting the curve 40 it will be appreciated that any eccentric disposition of the casing 12 relative to the bore hole at the level from which data is obtained from the detector will also affect the detected levels of radiation. Thus, the eccentric background radiation curve 50 is estimated from curve 48 based on the eccentricity of the casing relative to the bore hole at the location where curve 40 is recorded. Finally, pronounced irregularities in the resultant detected curve 40 will occur because of the concentration of fracturing medium at the vertical fracture zones 34 as indicated by the estimated fracture radiation curve 52. If the curve 48 is geometrically subtracted from curve 40, a curve representing the combination of curves 50 and 52 remains which will have a radially projecting portion from which one may deduce curve 52 by interpolative, trial and error methods leaving curve 50 representing the error introduced by the eccentric disposition of the detector relative to the bore hole center 44. Thus, the curve 40 may be interpreted by approximation to reveal the eccentric disposition of the well casing, if any, at the level being inspected and to identify the amplitude peaks produced by the concentration of fracturing medium at the vertical fracture zones. The direction of a vertical fracture plane 54 relative to the reference direction 46 may thereby be estimated from the information recorded at those inspection levels of the tool 22 likely to detect the presence of a fracture plane as hereinbefore discussed. Thus, the interpretation of curves 40 at various levels will establish the existence of a vertical fracture plane or any other fracture pattern that may occur in the subsurface formation.

As hereinbefore suggested, fracturing of a subsurface formation in accordance with the usual procedure described in connection with FIGURE 1 has been found to produce vertical fracture planes through the subsurface formation. It has also been found in some locations that fracturing of the subsurface formation at adjacent bore holes such as the bore holes 56 and 58 diagrammatically shown in FIGURE 6, produce fracture zones 60 and 62 which lie substantially along parallel vertical planes according to the recorded information obtained pursuant to the method of the present invention. This information may be particularly useful in connection with the location of adjacent wells within an oil field area 64, for example, as shown in FIGURE 6, inasmuch as subsurface accumulation of oil will drain through the vertical fracture zones into the bore holes. Accordingly, the drilling of a well 66, for example, as shown by dotted lines in FIGURE 6 at a location intersecting the fracture zone 60 associated with bore hole 56 may be avoided. Instead, bore holes may be located along directions perpendicular to the vertical planes associated with the vertical fracture zones as diagrammatically shown in FIGURE 6. It will, of course, be appreciated that the fracture data obtained in accordance with the method of the present invention may be useful in connection with other purposes.

From the foregoing description the utility and practice of the method of the present invention will be apparent as well as the construction and use of apparatus described. Although the apparatus described in connection with the fracture detecting tool 22 has been found to be particularly successful in obtaining data capable of being interpreted on site, it will be appreciated that other fracture detecting equipment may be devised pursuant to the method of the present invention and that data analyzing equipment may be utilized in order to determine the extent and nature of both vertical and horizontal fracturing of subsurface formations.

As hereinbefore indicated, the radiation detector is rotated about the rotational axis of the fracture inspecting tool at a relatively low speed. The speed at which the detector is rotated is selected in accordance with the limited surface area of the detector exposed to radiation and the operational response time of the detector in providing a radiation level measurement at each of the circumferential locations of the bore hole.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of locating vertical fracture planes in a subsurface formation comprising the steps of: boring a vertical hole into the formation; injecting a fracturing medium into the formation from the hole to establish vertical fracture zones; measuring the radial distribution of the fracturing medium relative to the center of a casing in said hole at a plurality of vertically spaced inspection levels; and angularly locating the vertical fracture zones extending between said inspection levels from the measured radial distribution of the fracturing medium, said fracturing medium containing a tracer agent and said step of measuring the distribution of the fracturing medium including instantaneously detecting the directional concentration of said tracer agent along each radial direction relative to said center of the casing and recording the variable angular concentration of the tracer agent detected at each of said inspection levels, said tracer agent constituting a radiation emitting substance; detecting the radial distribution of radiation prior to injection of said fracturing medium at a location where the bore hole center coincides with the center of the casing; and recording said prior radial distribution of radiation forming a pattern of background radiation for interpretation of the recorded radial concentration of the tracer agent after injection of the fracturing medium.

2. The method of claim 1 wherein said fracturing medium is injected in the same radial direction relative to the hole at depths vertically spaced between said inspection levels.

3. The method of claim 1 wherein said fracturing medium is injected in a plurality of radial directions relative to said hole at each of said inspection levels.

4. A method of locating a new bore hole relative to a previously established adjacent bore hole comprising the steps of: locating a vertical fracture plane intersecting the previously established bore hole by injecting a fracturing medium into the formation from the previously established bore hole; measuring the peripheral distribution of the injected fracturing medium about the previously established bore hole; determining the angular orientation of maximum concentration of injected fracturing medium; and comparing the angular orientations determined at a plurality of vertically spaced inspection levels within the previously established bore hole to locate the vertical fracture plane where said angular orientations substantially coincide; and spacing the new bore hole from the previously established bore hole along a line passing through the previously established bore hole and substantially perpendicular to said located vertical fracture plane.

References Cited

UNITED STATES PATENTS

| | | | |
|---|---|---|---|
| 2,316,361 | 4/1943 | Piety. | |
| 2,686,881 | 8/1954 | Herzog et al | 250—83.6 |
| 2,951,535 | 9/1960 | Mihram et al. | 166—42 |
| 2,952,319 | 9/1960 | Popham | 166—35 |
| 3,075,581 | 1/1963 | Kern | 166—42 |
| 3,086,760 | 4/1963 | Bays | 166—42 X |
| 3,175,608 | 3/1965 | Wilson | 175—4.51 |
| 3,193,010 | 7/1965 | Bielstein | 166—21 |
| 3,270,816 | 9/1966 | Staadt | 166—42 |
| 3,285,335 | 11/1966 | Reistle | 166—4 X |
| 3,288,210 | 11/1966 | Bryant | 166—4 |

OTHER REFERENCES

Jones, P. H., et al., Oil Well Cementing, Factors Influencing Bond Between Cement and Formation, A.P.I. Paper No. 801–16–B, Los Angeles, Calif., Am. Pet. Inst., 1940. Page 3 and Figs. 3 and 4 Relied On.

"Why Should I Fracture My Well . . . And How?" Oil & Gas Journal Tech-Report, 1957, pp. F and G.

CHARLES E. O'CONNELL, *Primary Examiner.*

I. A. CALVERT, *Assistant Examiner.*